US012688494B2

(12) United States Patent
Zhan et al.

(10) Patent No.: US 12,688,494 B2
(45) Date of Patent: Jul. 21, 2026

(54) DATA PROCESSING METHOD, APPARATUS, DEVICE AND COMPUTER-READABLE STORAGE MEDIUM

(71) Applicant: CHINA UNIONPAY CO., LTD., Shanghai (CN)

(72) Inventors: Chengchu Zhan, Shanghai (CN); Haijian Jiang, Shanghai (CN); Zhenzhong Zou, Shanghai (CN); Jinren Lin, Shanghai (CN); Gang Liu, Shanghai (CN); Hua Cai, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/910,676

(22) PCT Filed: Jan. 20, 2021

(86) PCT No.: PCT/CN2021/072925
§ 371 (c)(1),
(2) Date: Sep. 9, 2022

(87) PCT Pub. No.: WO2022/016840
PCT Pub. Date: Jan. 27, 2022

(65) Prior Publication Data
US 2023/0058201 A1 Feb. 23, 2023

(30) Foreign Application Priority Data
Jul. 24, 2020 (CN) .......................... 202010725073.2

(51) Int. Cl.
*G06Q 20/34* (2012.01)
(52) U.S. Cl.
CPC .................................. *G06Q 20/354* (2013.01)

(58) Field of Classification Search
None
See application file for complete search history.

(56) References Cited

U.S. PATENT DOCUMENTS 10,853,791 B1 * 12/2020 Ellis ..................... G06Q 20/325
2010/0057624 A1 3/2010 Hurt et al.
(Continued)

FOREIGN PATENT DOCUMENTS

CA 3050480 A1 1/2020
CN 101511074 A 8/2009
(Continued)

OTHER PUBLICATIONS

Bouchard, Anthony; "Changing the Default payment method in Apple Pay", iDownload Blog, Jan. 23, 2019, https://www.idownloadblog.com/2016/05/30/change-default-card-apple-pay/ (Year: 2019) (Year: 2019).*

(Continued)

*Primary Examiner* — David P Sharvin
(74) *Attorney, Agent, or Firm* — Anova Law Group, PLLC

(57) ABSTRACT

The application discloses a data processing method, apparatus, device and medium. The data processing method includes: receiving target activation data and a target activation instruction sent by a target server, wherein the target activation data includes a payment token to be activated corresponding to a payment card account number which needs to be activated; updating, in response to the target activation instruction, a target payment token in target personalized data to be the payment token to be activated, wherein a transaction card type indicated by the target personalized data is same as a transaction card type indicated by the target activation instruction; and setting the updated target payment token to be in an activated state.

6 Claims, 8 Drawing Sheets

(56) References Cited

U.S. PATENT DOCUMENTS

| | | | | |
|---|---|---|---|---|
| 2012/0078735 | A1* | 3/2012 | Bauer | G06Q 20/20 |
| | | | | 705/16 |
| 2017/0201850 | A1* | 7/2017 | Raleigh | H04W 4/50 |
| 2021/0185214 | A1 | 6/2021 | Anderberg et al. | |

FOREIGN PATENT DOCUMENTS

| | | | |
|---|---|---|---|
| CN | 105741106 | A | 7/2016 |
| CN | 106920090 | A | 7/2017 |
| CN | 107016486 | A | 8/2017 |
| CN | 109034818 | A | 12/2018 |
| CN | 109993513 | A | 7/2019 |
| CN | 110462663 | A | 11/2019 |
| CN | 110781699 | A | 2/2020 |
| CN | 111932245 | A | 11/2020 |
| JP | 2018014088 | A | 1/2018 |
| JP | 2022541670 | A | 9/2022 |
| TW | M563013 | U | 7/2018 |

OTHER PUBLICATIONS

Bouchard, Anthony; "Changing the Default payment method in Apple Pay", iDownload Blog, Jan. 23, 2019, https://www.idownloadblog.com/2016/05/30/change-default-card-apple-pay/ (Year: 2019).*

International Search Report dated Apr. 1, 2021 issued for International PCT Application No. PCT/CN2021/072925.

First Office Action dated May 3, 2022 issued for Taiwanse Patent Application No. 110111411.

IP Australia; Examination Report for Australian Patent Application No. 2021312655 dated Apr. 26, 2023, 9 pages.

CNIPA; Notice of Allowance for Chinese Patent Application No. 202010725073.2 dated Jul. 28, 2023, 8 pages.

JPO; Notice of Reasons for Refusal for Japanese Patent Application No. 2022-541670 dated Aug. 28, 2023, 8 pages.

JPO; Decision to Grant for Japanese Patent Application No. 2022-541670 dated Mar. 6, 2024, 5 pages.

* cited by examiner

Internet financial platform server
120

Electronic device          • • •          Electronic device
110                                        110

TSP platform server
130

Internet financial platform
server 120

Electronic device          • • •          Electronic device
110                                        110

TSM platform server
140

TSP platform server
130

Internet financial platform
server 120

Electronic device
110

Electronic device
110

TSM platform server
140

TSP platform server
130

Acquiring platform
server 160

Internet financial
platform server
120

Acquiring device 150

Electronic device
110

Electronic device
110

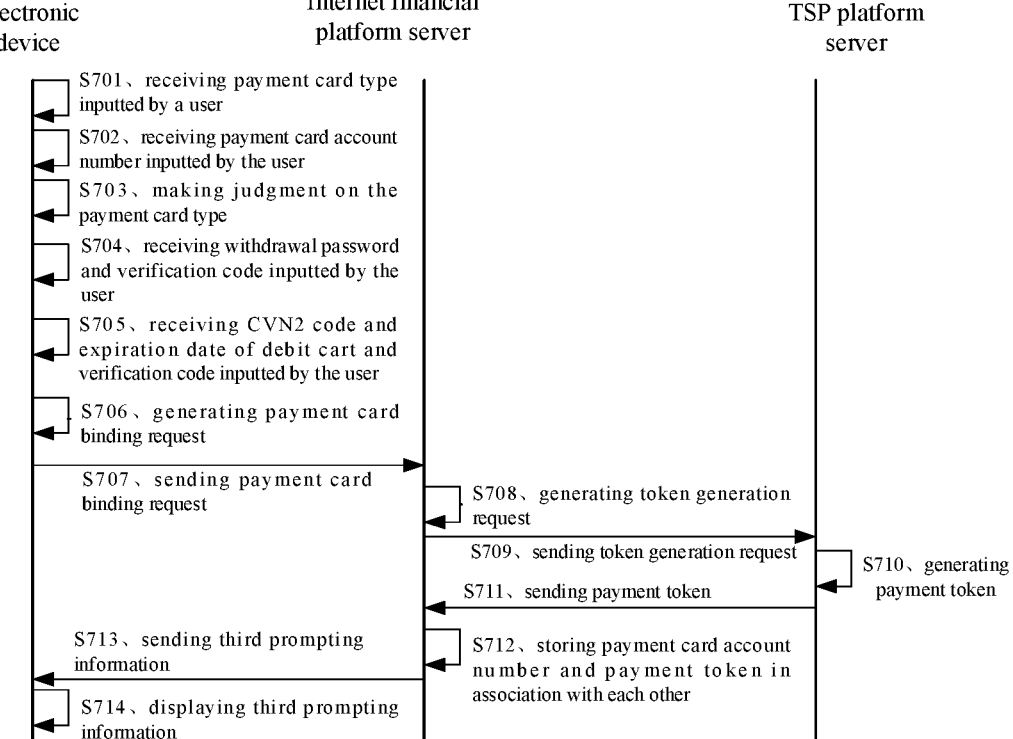

Electronic device

Internet financial platform server

TSP platform server

S701、receiving payment card type inputted by a user

S702、receiving payment card account number inputted by the user

S703、making judgment on the payment card type

S704、receiving withdrawal password and verification code inputted by the user

S705、receiving CVN2 code and expiration date of debit cart and verification code inputted by the user S706、generating payment card binding request S707、sending payment card binding request S708、generating token generation request S709、sending token generation request S710、generating payment token S711、sending payment token S713、sending third prompting information S712、storing payment card account number and payment token in association with each other S714、displaying third prompting information

Fig. 7

DATA PROCESSING METHOD, APPARATUS, DEVICE AND COMPUTER-READABLE STORAGE MEDIUM

CROSS-REFERENCE TO RELATED APPLICATIONS

The application is a National Stage of International Application No. PCT/CN2021/072925, filed on Jan. 20, 2021, which claims priority of Chinese Patent Application No. 202010725073.2, filed on Jul. 24, 2020, entitled by "Data Processing Method, Apparatus, Device and Medium", both of which are incorporated herein by reference in their entireties for all purposes.

TECHNICAL FIELD

The application relates to the field of data processing technology, and in particular, a data processing method, a data processing apparatus, a data processing device and a computer-readable storage medium.

BACKGROUND

With development of science and technology, a Near Field Communication (Near Field Communication, NFC) payment function has gradually become a standard configuration for an electronic device. When a user is shopping or taking a public transportation vehicle, it requires only that the electronic device is brought close to a point of sale (Point of Sale, POS) terminal or a card reader in the public transportation vehicle, and then payment can be finished in a short time.

SUMMARY

In an embodiment of the application, there is provided a data processing method, including: receiving target activation data and a target activation instruction sent by a target server, wherein the target activation data includes a payment token to be activated corresponding to a payment card account number which needs to be activated; updating, in response to the target activation instruction, a target payment token in target personalized data to be the payment token to be activated, wherein a transaction card type indicated by the target personalized data is same as a transaction card type indicated by the target activation instruction; and setting the updated target payment token to be in an activated state In an embodiment of the application, there is provided a data processing method, including: acquiring and a target activation instruction and a payment token to be activated which is stored in association with a payment card account number which needs to be activated, wherein a transaction card type of the payment card account number which needs to be activated is same as a transaction card type indicated by the target activation instruction; generating target activation data according to the payment token to be activated; and sending the target activation data and the target activation instruction to a target electronic device, wherein the target activation instruction is configured to request the target electronic device to update a target payment token in target personalized data to be the payment token to be activated and set the updated target payment token to be in an activated state, wherein a transaction card type indicated by the target personalized data is same as the transaction card type indicated by the target activation instruction.

In an embodiment of the application, there is provided a data processing apparatus, including: a first reception module configured to receive target activation data and a target activation instruction sent by a target server, wherein the target activation data includes a payment token to be activated corresponding to a payment card account number which needs to be activated; a first processing module configured to update, in response to the target activation instruction, a target payment token in target personalized data to be the payment token to be activated, wherein a transaction card type indicated by the target personalized data is same as a transaction card type indicated by the target activation instruction; and a second processing module configured to set the updated target payment token to be in an activated state.

In an embodiment of the application, there is provided a data processing apparatus, including: an acquisition module configured to acquire and a target activation instruction and a payment token to be activated which is stored in association with a payment card account number which needs to be activated, wherein a transaction card type of the payment card account number which needs to be activated is same as a transaction card type indicated by the target activation instruction; a first generation module configured to generate target activation data according to the payment token to be activated; and a first transmission module configured to send the target activation data and the target activation instruction to a target electronic device, wherein the target activation instruction is configured to request the target electronic device to update a target payment token in target personalized data to be the payment token to be activated and set the updated target payment token to in an activated state, wherein a transaction card type indicated by the target personalized data is same as the transaction card type indicated by the target activation instruction.

In an embodiment of the application, there is provided a data processing device, including: a processor; and a memory storing computer program instructions, wherein the processor is configured to execute the computer program instructions to implement the data processing method as described in the first aspect or the second aspect.

In an embodiment of the application, there is provided a computer-readable storage medium storing computer program instructions, wherein the computer program instructions are executed by a processor to implement the data processing method as described above.

BRIEF DESCRIPTION OF THE DRAWINGS

In order to illustrate technical solutions of the embodiments of the application more clearly, the accompanying drawings that need to be used in the embodiments of the application will be briefly described below. For those skilled in the art, other drawings can be obtained from these drawings without creative efforts.

FIG. 7 is a schematic flowchart of an example of a process for binding a payment card according to an embodiment of the application;

DETAILED DESCRIPTIONS

The features and exemplary embodiments of various aspects of the application will be described in detail below. In order to make the purposes, technical solutions and advantages of the application more clear, the application will be further described in detail below with reference to the accompanying drawings and specific embodiments. It should be understood that the specific embodiments described herein are only configured to explain the application, and are not configured to limit the application. It will be apparent to those skilled in the art that the application may be practiced without some of these specific details. The following description of the embodiments is merely to provide a better understanding of the application by illustrating examples of the application.

It should be noted that, in this document, relational terms such as first and second are only used to distinguish one entity or operation from another entity or operation, and do not necessarily require or imply that these entities or operations must have any of such actual relationship or sequence. Moreover, the terms "comprising", "including" or any other variation thereof are intended to encompass a non-exclusive inclusion such that a process, method, article or device that includes a list of elements includes not only those elements, but also includes other elements that are not explicitly listed or those elements that are inherent to such a process, method, article or device. Without further limitation, an element defined by the phrase "comprising . . . " does not preclude presence of additional equivalent elements in a process, method, article, or device that includes the element.

The data processing method according to the application may be applied to architectures as shown in FIG. 1 to FIG. 4, and will be described in detail with reference to FIGS. 1 to 4.

Figure 1:
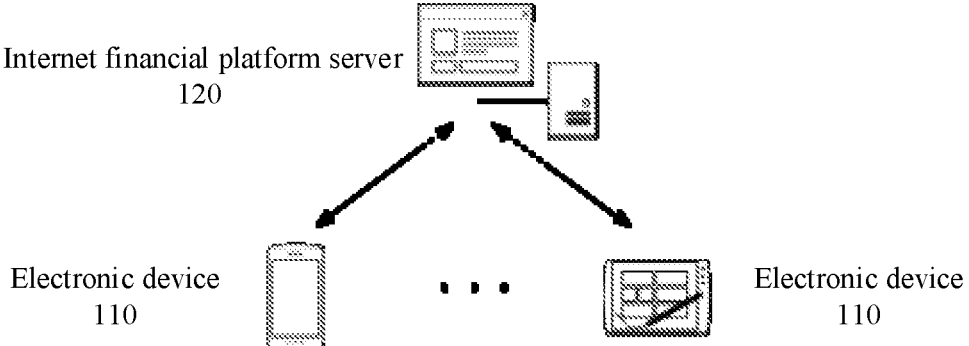
FIG. 1 is an architectural diagram of an example of data processing according to the application.

FIG. 1 shows an architecture diagram of an example of data processing according to an embodiment of the application. As shown in FIG. 1, the architecture diagram may include at least one electronic device 110 and an Internet financial platform server 120.

The electronic device 110 may be a device with a communication function, such as a mobile phone, a tablet computer, a desktop computer, a vehicle terminal, and a wearable device, and the electronic device 110 has an NFC payment function. The wearable device may be a portable device that can be worn by a user or integrated into the user's clothing or accessories, such as a smart bracelet, a smart watch, smart sport shoes, smart garment, smart glasses, a smart helmet, a smart ring, a smart accessory, or the like.

The Internet financial platform server 120 may be configured to provide Internet financial services. Specifically, the Internet financial platform server 120 may be a device with storage and computing functions, such as a cloud server or a server cluster.

Still referring to FIG. 1, each electronic device 110 may be installed with a financial application which corresponds to an Internet financial platform, and communicates with the Internet financial platform server 120. The Internet financial platform may be a third-party financial platform or a card organization platform.

The Internet finance platform server 120 can obtain a payment token (Token) to be activated that is stored in association with an payment card account number which needs to be activated of the electronic device 110 and a target activation instruction which indicates a transaction card type being the same as a transaction card type of an activated payment card account number, and send the payment token to be activated and target activation instruction to a target electronic device. The payment card account number may include an account number of a physical bank card or an account number of an electronic bank card, and there is a one-to-one correspondence between the payment token and the payment card account number.

The electronic device 110 can receive the payment token to be activated corresponding to the payment card account number which needs to be activated and the target activation instruction sent by the Internet financial platform server 120, then update a target payment token in target transaction data of which a transaction card type is same a transaction card type indicated by the target activation instruction to be the payment token to be activated, and set the updated target payment token to be in an activated state.

Figure 2:
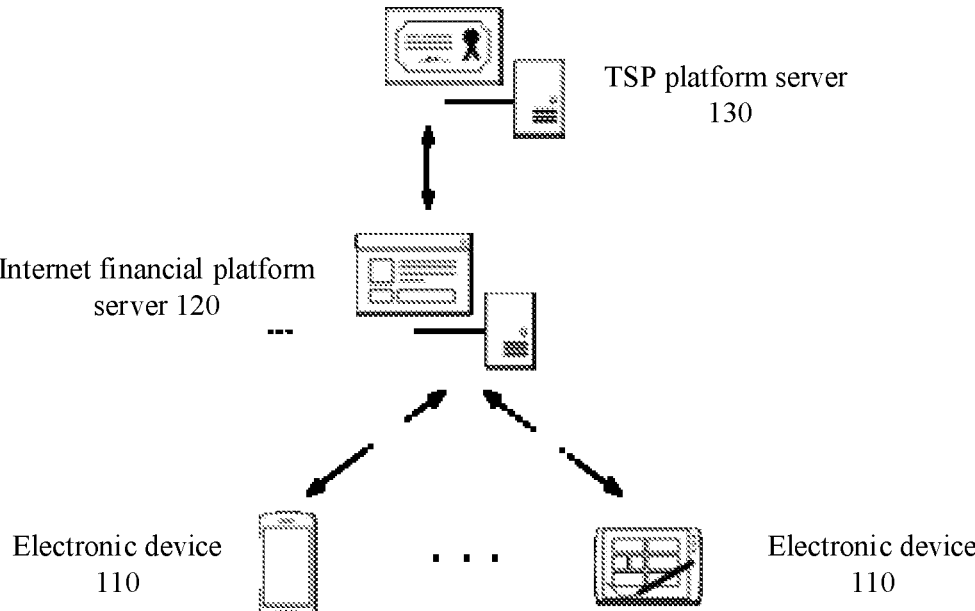
FIG. 2 is an architectural diagram of another example of data processing according to the application.

FIG. 2 shows an architectural diagram of another example of data processing according to an embodiment of the application. As shown in FIG. 2, the architecture diagram may include at least one electronic device 110, an Internet financial platform server 120 and a payment tokenization service system (Token Service Provider, TSP) platform server 130.

The principles of the electronic device 110 and the Internet financial platform server 120 are the same as those of the embodiment shown in FIG. 1, and will not be repeated here.

The TSP platform server 130 may be configured to generate a payment token. Specifically, the TSP platform server 130 may be a device with storage and computing functions, such as a cloud server or a server cluster. The Internet financial platform server 120 may communicate with the TSP platform server 130 to obtain a payment token corresponding to a payment card account number for a user.

The Internet financial platform server 120 can generate an payment card account number for a payment token and a token generation request as required, send the token generation request to the TSP platform server 130 so that the TSP platform server 130 generates the payment token corresponding to the payment card account number, and feed the payment token back to the financial platform server 120.

Upon reception of the payment token fed back by the TSP platform server 130, the Internet financial platform server 120 can store the received payment token and the payment card account number in association with each other.

Figure 3:
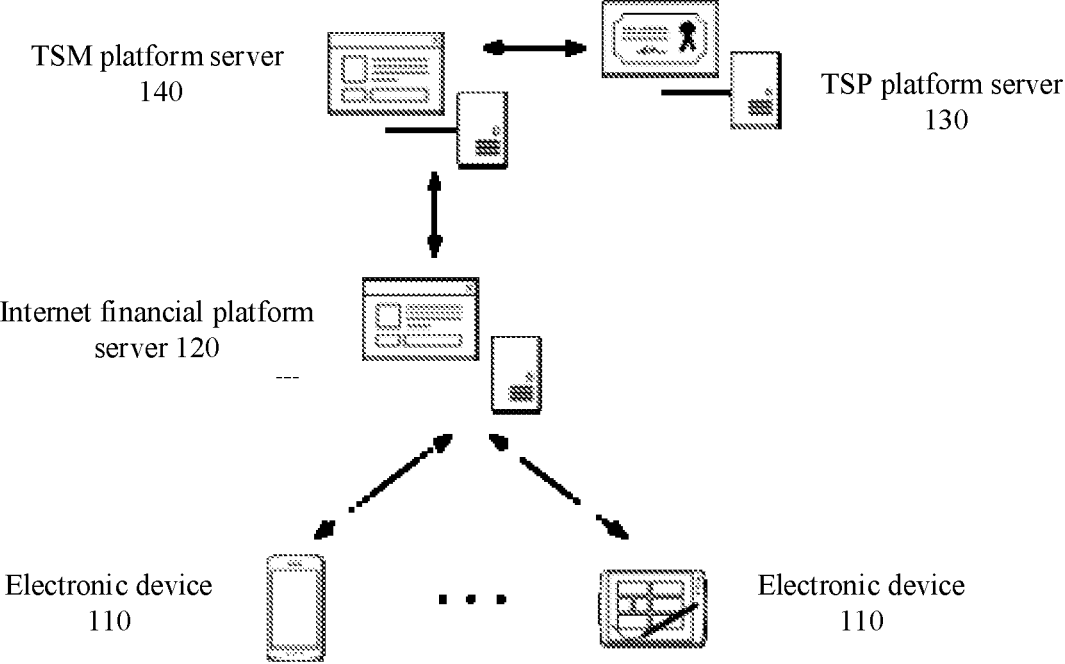
FIG. 3 is an architectural diagram of another example of data processing according to the application.

FIG. 3 shows an architectural diagram of yet another example of data processing according to the application. As shown in FIG. 3, the architecture diagram may include at least one electronic device 110, an Internet financial platform server 120, a TSP platform server 130 and a Trusted Service Management (TSM) platform server 140.

The principles of the electronic device 110, the Internet financial platform server 120 and the TSP platform server 130 are the same as those of the embodiment shown in FIG. 2, and will not be repeated here.

The TSM platform server 140 may be configured to implement information forwarding, and the TSM platform server 140 may be a device with storage and computing functions, such as a cloud server or a server cluster. Specifically, the TSM platform server 140 may be in a communicate connection with the TSP platform server 130 through a trusted channel, so as to improve security of information transmission.

The Internet financial platform server 120 can communicate with the TSM platform server 140. The Internet financial platform server 120 can send the token generation request to the TSM platform server 140, and then the TSM platform server 140 sends the token generation request to the TSP platform server 130 through the trusted channel. The TSP platform server 130 can send the payment token to the TSM platform server 140 through the trusted channel, so that the TSM platform server 140 forwards the payment token to the Internet financial platform server 120.

Therefore, in the embodiment of the application, security of communication between the Internet financial platform server 120 and the TSP platform server 130 can be improved through the TSM platform server 140 and the trusted channel.

Figure 4:
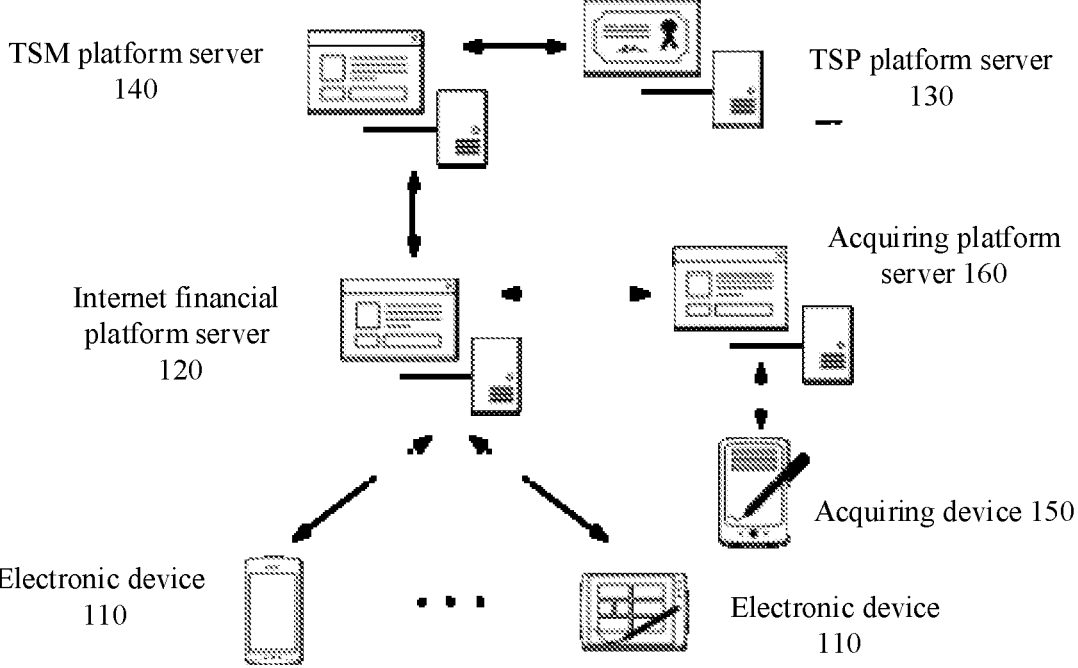
FIG. 4 is an architectural diagram of yet another example of data processing p according to the application.

FIG. 4 shows an architecture diagram of yet another example of data processing according to the application. As shown in FIG. 4, the architecture diagram may include at least one electronic device 110, an Internet financial platform server 120, a TSP platform server 130, a TSM platform server 140, at least one acquiring device 150 and an acquiring platform server 160.

The principles of the electronic device 110, the Internet financial platform server 120, the TSP platform server 130 and the TSM platform server 140 are the same as those of the embodiment shown in FIG. 3, and will not be repeated here.

The acquiring device 150 may be a mobile phone, a tablet computer, a point of sale (POS) terminal, or the like, and the acquisition device 150 has an NFC information reading function.

The acquiring platform server 160 may be configured to provide acquiring services. Specifically, the acquiring platform server 160 may be a device with storage and computing functions, such as a cloud server or a server cluster.

The user may first login an account of the financial application of the electronic device 110 to enable the financial application to be in a login state, and inputs a payment state of a designated electronic device that is bound to the account in an application interface of the financial application. The designated electronic device may be an electronic device 110 being operated by the user, or may be any other electronic device bound to the account, as long as it is an electronic device bound to the account and having passed device verification. Then, the user can select a payment card account number whose state needs to be changed from a plurality of payment card account numbers bound to the designated electronic device that are displayed in the application interface of the financial application, and the electronic device 110 generates a state changing request according to the payment card account number and the payment state of the designated electronic device. Next, the electronic device 110 can send the state changing request to the Internet financial platform server 120 which corresponds to the Internet financial platform.

After reception of the state changing request sent by the electronic device 110, the Internet financial platform server 120 can parse the received state changing request to obtain the payment card account number and the payment state carried in the state changing request. Then, the Internet financial platform server 120 acquires a payment token which is stored in association with the payment card account number, and update a token state corresponding to the payment token to the payment state carried in the state changing request. If the payment card account number is an account number of a default payment card of the electronic device 110, the Internet financial platform server 120, upon reception of a transaction request that carries the payment token which is stored in association with the payment card account number sent by the acquiring device 150 through the acquiring platform server 160, can determine whether to execute a transaction corresponding to the transaction request according to the token state corresponding to the payment token.

Each acquiring device 150 may be configured to send a transaction request that carries an activated payment token read from a security element (Security Element, SE) of the electronic device 110 to the Internet financial platform server 120 through the acquiring platform server 160.

Specifically, the acquiring device 150 may be installed with an acquiring application corresponding to an acquiring platform. The acquiring device 150 can read the payment token in the SE of the electronic device 110 through the acquiring application, and then send the transaction request carrying the read payment token to the Internet financial platform server 120 through the acquiring platform server 160 which corresponds to the acquiring platform.

After reception of the transaction request, the Internet financial platform server 120 determines whether to execute a transaction corresponding to the transaction request according to a token state corresponding to the payment token carried in the transaction request. When the user cannot change the payment state of the designated electronic device, the payment state of the designated electronic device may be changed by way of changing a token state in the Internet financial platform server 120 which corresponds to the payment token which is stored in association with the payment card account number bound to the designated electronic device, thereby reducing a risk of a payment card account number associated with the target electronic device being stolen and used, and improving security of the payment card account number of the user.

According to the above architectures, a data processing method according to an embodiment of the application will be described in detail below with reference to FIG. 5 to FIG. 10.

Figure 5:
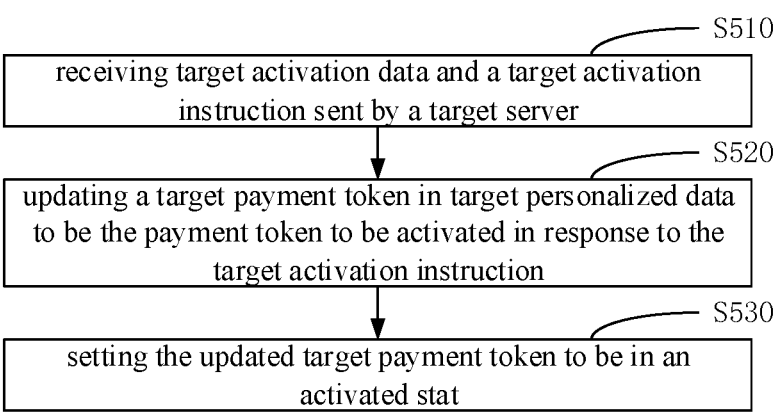
FIG. 5 is a schematic flowchart of an example of a data processing method according to the application.

FIG. 5 shows a schematic flowchart of an example of a data processing method according to the application.

In some embodiments of the application, the method shown in FIG. 5 may be executed by a target electronic device among the electronic devices 110 shown in FIG. 1 to FIG. 4. The target electronic device may be any one of the electronic devices 110.

As shown in FIG. 5, the data processing method may include the following steps.

At S510, target activation data and a target activation instruction sent by a target server is received.

The target server may be the Internet financial platform server 120 shown in FIG. 1 to FIG. 4.

The target activation data may include a payment token to be activated corresponding to a payment card account number which needs to be activated. The payment card account number which needs to be activated may include any one of a default payment card account number which needs to be set and a default payment card account number which needs to to be changed, which is not limited herein.

A transaction card type indicated by the target activation instruction is same as a transaction card type of the payment card account number which needs to be activated, so that the target activation instruction can load the payment token to be activated corresponding to the payment card account number which needs to be activated to target personalized data, of which a transaction card type is same as the transaction card type of the payment card account number which needs to be activated.

At S520, a target payment token in the target personalized data is updated as the payment token to be activated in response to the target activation instruction.

Since the transaction card type indicated by the target personalized data is same as the transaction card type indicated by the target activation instruction, it can be ensured that the payment token to be activated corresponding to the payment card account number which needs to be activated is loaded to the target personalized data, of which the transaction card type is same as the transaction card type of the payment card account number which needs to be activated, thereby avoiding errors in an activation process for the payment token to be activated.

The target personalized data may be a personalized application identifier (AID), which includes character strings. The personalized AID includes a generic character string, a payment token, and a state value. The payment token may include a character string, and the payment token and the state value may be located after the generic character string.

For example, the generic character string of the personalized AID may be: A000000333 010102 00 63020000 01 0000. The first 10 digits may be a fixed string, the $11^{th}$-$16^{th}$ digits may be configured to indicate an account type, for example, 010101 for a debit card type, 010102 for a credit card type, 010103 for a quasi-credit card type, and the $17^{th}$-$18^{th}$ digits may indicate an application type, for example, 00 for a financial application and 01 for a non-financial application, the $19^{th}$-$26^{th}$ digits may be an institution code of an application provider, the $27^{th}$-$28^{th}$ digits may be extendable bits, whose functions can be customized, and the $29^{th}$-$32^{th}$ digits may indicate a chip card type, for example, 0000 for PBOC2.0 type and 1000 for PBOC3.0 type.

In some embodiments of the application, in a case where the payment card account number which needs to be activated is a default payment card account number which needs to be set, the target payment token in the target personalized data may be an initialization token. The target electronic device can replace the initialization token with the payment token to be activated in response to the target activation instruction.

In some embodiments of the application, the target activation instruction may be an application protocol data unit (Application Protocol Data Unit, APDU) instruction, such as an Install for install command, definition of parameters of which may be found in GP Amendment C particularly.

The target electronic device may be installed with a target personalized data activation program which corresponds to the target personalized data, and executes a target loading operation corresponding to the target activation instruction by using the target personalized data activation program, that is, update the target payment token in the target personalized data as the payment token to be activated by using the target personalized data activation program.

At S530, the updated target payment token is set to be in an activated state.

The target electronic device can execute a target activation operation corresponding to the target activation instruction by using the target personalized data activation program, that is, activate the target personalized data by using the target personalized data activation program, so as to realize activation of the target payment token.

In the embodiment of the application, upon reception of a target activation instruction and a payment token to be activated corresponding to a payment card account number which needs to be activated sent by a target server, a target payment token in a target personalized data which belongs to a transaction cart having a same type as that indicated in the target activation instruction can be directly updated as the payment token to be activated and the updated target payment token can be set to be in an activated state, so it is possible to directly update the target payment token in the target personalized data by using the payment token to be activated and to activate the updated target payment token without deleting an activated payment token and its corresponding personalized data in the process of activating the payment token to be activated, thereby reducing processes of deleting personalized data, verifying personalized data and downloading personalized data in the process of activating the payment token to be activated, and thus avoiding errors caused by the above-mentioned processes when setting a default payment card so as to improve a success rate of setting the default payment card.

In some embodiments of the application, in a case where the payment card account number is a default payment card account number which needs to be set, before the S510, the data processing method may further include: receiving the default payment card account number which needs to be set; and generating a default card setting request according to the default payment card account number which needs to be set; and sending the default card setting request to the target server, wherein the default card setting request is configured to request the target server to feed back the target activation data and the target activation instruction corresponding to the default payment card account number which needs to be set.

Specifically, a user may select any payment card account number from at least one payment card account number bound to the target electronic device which is displayed in an application interface of a financial application of the target electronic device as the default payment card account number which needs to be set. The electronic device may generate a default card setting request according to the default payment card account number which needs to be set and the target electronic device identifier, and then send the default card setting request to the Internet financial platform server, and the Internet financial platform server can feed back the target activation data and the target activation instructions that correspond to the default payment card account number which needs to be set. The method for the Internet financial platform server to feed back the target activation data and the target activation instructions will be described in detail later.

In some embodiments of the application, the target electronic device identifier may be an internet protocol (Internet Protocol, IP) address of the target electronic device. In some other embodiments, the target electronic device identifier may be a device identity code (Identity Document, ID) of the target electronic device.

In some embodiments of the application, in a case where the payment card account number is a default payment card account number which needs to be set, since no other payment token has been activated in the target electronic device before, the target personalized data may be personalized data which is stored in the target security element of the target electronic device and for which a payment token is in an inactivated state.

In some embodiments, when receiving the target activation data and the target activation instruction sent by the target server, the target electronic device may directly execute the S520 if the target personalized data has been stored in the target security element of the target electronic device.

In some other embodiments, when receiving the target activation data and the target activation instruction sent by the target server, the target activation data received by the target electronic device may further includes the target personalized data if the target personalized data has not been stored in the target security element of the target electronic device. In some embodiments, before the S520, the data processing method may further include: storing the target personalized data in the target security element.

Therefore, in a case where the target security element of the target electronic device has not been stored the target personalized data, the target personalized data may be loaded into the target security element first, so as to ensure reliability of the payment token to be activated corresponding to the payment card account number which needs to be activated.

In some embodiments of the application, in a case where the payment card account number is a default payment card account number which needs to be changed, before the S510, the data processing method may further include: receiving the default payment card account number which needs to be changed; generating a default card changing request according to the default payment card account number which needs to be changed; and sending the default card changing request to the target server, wherein the default card changing request is configured to request the target server to feed back the target activation data and the target activation instruction corresponding to the default payment card account number which needs to be changed.

Specifically, a user may select any payment card account number other than a payment card account number that has been set as a payment card account number of a default payment card from at least one payment card account number bound to the target electronic device which is displayed in an application interface of a financial application of the target electronic device as the default payment card account number which needs to be changed. The electronic device may generate a default card changing request according to the default payment card account number which needs to be changed and the target electronic device identifier of the target electronic device, such that the Internet financial platform server feeds back the target activation data and the target activation instructions corresponding to the default payment card account number which needs to be changed. The method for the Internet financial platform server to feeds back the target activation data and the target activation instructions will be described in detail later.

In some embodiments of the application, in a case where the payment card account number which needs to be activated is a default payment card account number which needs to be changed, another payment token has already been activated in the target electronic device. Therefore, in some embodiments, the target personalized data may be personalized data which is stored in the target security element of the target electronic device and for which a payment token is in an activated state. In some other embodiments, the target personalized data may be personalized data which is stored in the target security element and for which a payment token is in an inactivated state, which is not limited herein.

In some embodiments, when receiving the target activation data and the target activation instruction sent by the target server, the target electronic device may directly execute the S520 if the target personalized data has been stored in the target security element of the target electronic device.

In some other embodiments, when receiving the target activation data and the target activation instruction sent by the target server, in the case that the target personalized data has not been stored in the target security element of the target electronic device, the target activation data received by the target electronic device may further include the target personalized data. In some embodiments, before the S520, the data processing method may further include: storing the target personalized data in the target security element.

Therefore, in the case where the target security element of the target electronic device has not been stored the target personalized data, the target personalized data may be loaded into the target security element first, so as to ensure reliability of the payment token to be activated corresponding to the payment card account number which needs to be activated.

In some embodiments of the application, in a case where the target personalized data is personalized data which is stored in the target security element and for which a payment token is in an inactivated state, after the S530, the data processing method may further include: setting an activated payment token other than the updated target payment token to be in an inactivated state.

Since another payment token has been activated in the target electronic device before, it is necessary to set an activated payment token other than the updated target payment token, that is, a payment token which is in an activated state, to be in an inactivated state in order to avoid errors during reading by the acquiring device the target payment token in the target security element of the target electronic device.

In the embodiment of the application, the target electronic device may execute a target restoration operation corresponding to the target activation instruction by using a target personalized data activation program, that is, set personalized data of a payment token which has been in an activated state to be in an inactivated state by using the target personalized data activation program, which cancel activation of the payment token which is already in the activated state, so as to ensure that only one payment token in the target security element of the target electronic device is in the activated state.

Figure 6:
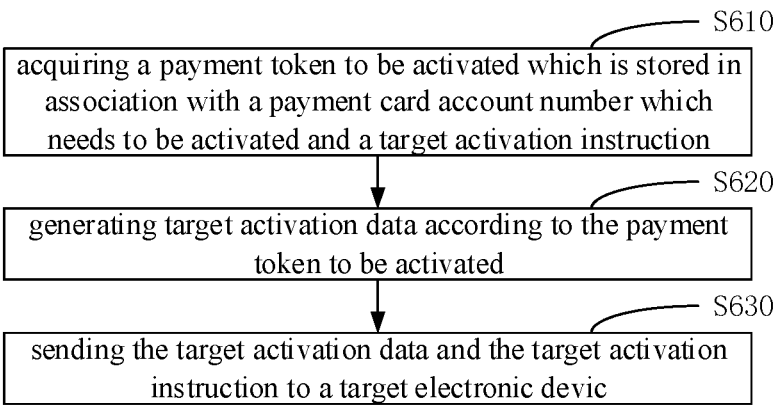
FIG. 6 is a schematic flowchart of another example of a data processing method according to the application.

FIG. 6 shows a schematic flowchart of another example of a data processing method according to the application.

In some embodiments of the application, the method shown in FIG. 6 may be performed by the Internet financial platform server 120 shown in FIG. 1 to FIG. 4.

As shown in FIG. 6, the data processing method may include the following steps.

At S610, a payment token to be activated which is stored in association with a payment card account number which needs to be activated and a target activation instruction are acquired.

A transaction card type of the payment card account number which needs to be activated is same as a transaction card type indicated by the target activation instruction.

Specifically, the Internet financial platform server may acquire a payment token to be activated from locally stored payment tokens which is stored in association with a payment card account number which needs to be activated, and acquire a target activation instruction from locally stored activation instructions, wherein a transaction card type indicated by the target activation instruction is same as a transaction card type of the payment card account number which needs to be activated.

At S620, target activation data is generated according to the payment token to be activated.

In some embodiments of the application, the payment token to be activated may be loaded into a data packet corresponding to the target activation data, so as to generate the target activation data.

At S630, the target activation data and the target activation instruction are sent to a target electronic device.

The target activation instruction is configured to instruct the target electronic device to update a target payment token in target personalized data to the payment token to be activated and set the updated target payment token to be in an activated state, wherein a transaction card type indicated by the target personalized data is same as the transaction card type indicated by the target activation instruction. The method for activating the payment token to be activated by the target electronic device has been described in detail in the method embodiment shown in FIG. 5, and will not be repeated here.

In the embodiment of the application, after a payment token to be activated which is stored in association with a payment card account number which needs to be activated and a target activation instruction which indicates a same transaction card type as that of the payment card account number which needs to be activated, target activation data is generated according to the payment token to be activated, and the target activation data and the target activation instruction are sent to the target electronic device, so that the target electronic device updates a target activation token in target personalized data of the same transaction card type as that indicated by the target activation instruction to be the payment token to be activated, and sets the updated target payment token to be in an activated state, and thus the target activation token in the target personalized data can be updated directly with the payment token to be activated and the updated target payment token can be activated accordingly without deleting an activated payment token and its corresponding personalized data in a process of activating the payment token to be activated, thereby reducing processes of deleting personalized data, verifying personalized data and downloading personalized data in the process of activating the payment token to be activated, and thus avoiding errors caused by the above-mentioned processes when setting a default payment card so as to improve a success rate of setting the default payment card.

In another embodiment of the application, before the S620, the data processing method may further include: acquiring the target personalized data, in order to avoid failure to activate the payment token to be activated caused by that the target personalized data has not been stored in the target security element of the target electronic device.

Correspondingly, the S620 may specifically include: generating the target activation data according to the payment token to be activated and the target personalized data.

Therefore, the Internet financial platform server can acquire the target personalized data from locally stored personalized data, wherein the transaction card type indicated by the target personalized data is same as a transaction card type indicated by the target activation instruction, and load the target personalized data together with the payment token to be activated into a data package corresponding to the target activation data, so as to generate the target activation data.

In some embodiments of the application, in order to further improve reliability of the target electronic device activating the payment token to be activated, before acquiring the target personalized data, the data processing method may further include: sending a data query request to the target electronic device, wherein the data query request is configured to query in a target security element of the target electronic device for the target personalized data; and receiving a data query result fed back by the target electronic device.

Correspondingly, the acquiring the target personalized data may specifically include: acquiring the target personalized data in a case where the data query result indicates that the target personalized data has not been found in the target security element.

Specifically, before the sending the target activation data and the target activation instruction to the target electronic device, the Internet financial platform server needs to first send a data query request to the target electronic device to query whether the target security element of the target electronic device has stored the target personalized data. After receiving the data query request, the target electronic device can query whether the target personalized data has been stored in the target security element, and feedback a data query result to the Internet financial platform server. The Internet financial platform server can receive the data query result fed back by the target electronic device, and directly generate the target activation data according to the payment token to be activated if the data query result indicates that the target personalized data has been found in the target security element; and acquire the target personalized data if the data query result indicates that the target personalized data has not been found in the target security element and generate the target activation data according to the payment token to be activated and the target personalized data.

Therefore, in the embodiment of the application, it may be first determined whether the target security element of the target electronic device stores the target personalized data required to activate the payment token to be activated, and then, according to a result of the determination, it is determined whether to send the target personalized data to the target electronic device to enable the target electronic device to reliably implement activation of the payment token to be activated.

In the embodiment of the application, the target personalized data required for the payment token to be activated may be personalized data of the same transaction card type as the transaction card type indicated by the target activation instruction. A payment card type may correspond to a set of personalized data.

For example, a credit card type may correspond to a set of personalized data, and a debit card type may correspond to a set of personalized data.

A payment card type may correspond to a set of general personalized data, which can eliminate differences in personalized data among various payment card issuers, and improve compatibility between a device card and an industrial machine.

In an embodiment of the application, the payment card account number which needs to be activated may include a default payment card account number which needs to be set.

Correspondingly, before the S610, the data processing method may further include: receiving a default card setting request sent by the target electronic device; and parsing, in response to the default card setting request, the default card setting request to obtain information of the default card setting request, wherein the information of the default card setting request includes the default payment card account number which needs to be set.

After receiving the default card setting request, the Internet finance platform server can parse, in response to the default card setting request, the default card setting request to obtain the default payment card account number which needs to be set and the target electronic device identifier of the target electronic device, and then query for a payment token which is stored in association with the default payment card account number which needs to be set and use it as the payment token to be activated.

Thus, in a case where the user needs to set a default card for the target electronic device, the Internet financial platform server can send the target activation data and the target activation instruction corresponding to the default payment card account number which needs to be set to the target electronic device.

In some embodiments of the application, in a case where the payment card account number which needs to be activated is a default payment card account number which needs to be set, after the S630, the data processing method may further include: receiving an activation result sent by the target electronic device, wherein the activation result is configured to indicate that the target electronic device has set the payment token to be activated to be in an activated state; setting, in response to the activation result, a payment card attribute corresponding to the payment card account number which needs to be activated as a target attribute, wherein the target attribute indicates a default payment card for the target electronic device; setting a token state corresponding to the payment token to be activated to be an activated state; and establishing an association relationship between the payment token to be activated and the target electronic device.

Specifically, after executing the target activation instruction, the target electronic device feedbacks an activation result to the Internet financial platform server. The activation result may be configured to indicate that the target electronic device has set the payment token to be activated to be in an activated state, or indicate that the target electronic device has failed to activate the payment token to be activated.

The Internet financial platform server may, after sending the target activation data and the target activation instruction to the target electronic device, receive the activation result sent by the target electronic device, and set a payment card attribute corresponding to the payment card account number which needs to be activated to indicate a default payment card for the target electronic device in a case where the activation result is configured to indicate that the target electronic device has set the payment token to be activated to be in an activated state, set a token state corresponding to the payment token to be activated to be an activated state, and establish an association relationship between the payment token to be activated and the target electronic device identifier of the target electronic device, which enables the NFC payment function of the target electronic device to be available.

Then, the Internet financial platform server may feedback first prompt information to the target electronic device. The first prompt information is configured to prompt the user that a default payment card has been successfully set for the target electronic device, and the target electronic device can use the NFC payment function normally through the default payment card.

In the embodiment of the application, the bound payment card account number and the personalized data in the target electronic device are in a loosely coupled relationship, that is, a dynamic mapping relationship. A mapping relationship between the default payment card account number and the target electronic device can be established by establishing an association relationship between the payment token to be activated and the target electronic device.

In some other embodiments of the application, the payment card account number which needs to be activated may include a default payment card account number which needs to be changed.

Correspondingly, before the S610, the data processing method may further include: receiving a default card changing request sent by the target electronic device; and parsing, in response to the default card changing request, the default card changing request to obtain information of the default card changing request, wherein the information of the default card changing request includes the default payment card account number which needs to be changed.

After receiving the default card changing request, the Internet finance platform server can parse, in response to the default card changing request, the default card changing request to obtain the default payment card account number which needs to be changed and the target electronic device identifier of the target electronic device, and then query for a payment token which is stored in association with the default payment card account number which needs to be changed and use it as the payment token to be activated.

Thus, in a case where the user needs to change a default card for the target electronic device, the Internet financial platform server can send the target activation data and the target activation instruction corresponding to the default payment card account number which needs to be changed to the target electronic device.

In some embodiments of the application, in a case where the payment card account number which needs to be activated is a default payment card account which needs to be changed, before the above-mentioned data query request is sent to the target electronic device, the data processing method may further include: acquiring a target payment card account number, wherein a payment card attribute corresponding to the target payment card account number is a target attribute, and the target attribute indicates a default payment card for the target electronic device.

Correspondingly, the sending the data query request to the target electronic device may specifically include: sending the data query request to the target electronic device in a case where a payment card type of the target payment card account number is different from a payment card type of the default payment card account number which needs to be changed.

Before sending the data query request to the target electronic device, the Internet financial platform server may query a current target payment card account number of the target electronic device whose payment card attribute indicates a default payment card, that is, the original default payment card account number. Then, a payment card type of the target payment card account number is compared with a payment card type of the default payment card account number which needs to be changed. Finally, if a result of the comparison is that the payment card type of the target payment card account number is the same as the payment card type of the default payment card account number which needs to be changed, it means that the target personalized data has been stored in the target security element of the target electronic device, so the target activation data may be directly generated according to the payment token to be activated. If the result of the comparison indicates that the payment card type of the target payment card account number is different from the payment card type of the default payment card account number which needs to be changed, it means that the target security element of the target electronic device has not stored the target personalized data, so it is necessary to send the target personalized data to the target electronic device, and thus the target personalized data is acquired, and the target activation data is then generated according to the payment token to be activated and the target personalized data.

In other embodiments of the application, in a case where the payment card account number which needs to be activated is a default payment card account which needs to be changed, after the S630, the data processing method may further include: receiving an activation result sent by the target electronic device, wherein the activation result is configured to indicate that the target electronic device has set the payment token to be activated to be in an activated state; setting a payment card attribute corresponding to the payment card account number which needs to be activated as a target attribute and setting a payment card attribute corresponding to the target payment card account number as a non-target attribute in response to the activation result; setting a token state corresponding to the payment token to be activated to an activated state, and setting a token state corresponding to the target payment token which is stored in association with the target payment card account number to an inactivated state; and establishing an association relationship between the payment token to be activated and the target electronic device, and deleting an association relationship between the target payment token and the target electronic device.

Specifically, after executing the target activation instruction, the target electronic device feedbacks an activation result to the Internet financial platform server. The activation result may be configured to indicate that the target electronic device has set the payment token to be activated to be in an activated state, or indicate that the target electronic device has failed to activate the payment token to be activated.

The Internet financial platform server may, after sending the target activation data and the target activation instruction to the target electronic device, receive the activation result sent by the target electronic device, and in a case where the activation result is configured to indicate that the target electronic device has set the payment token to be activated to be in an activated state, firstly set a payment card attribute corresponding to the payment card account number which needs to be activated to indicate a default payment card for the target electronic device and set a payment card attribute corresponding to the original default payment card account number to be in an inactivated state, then set a token state corresponding to the payment token which to be activated to be an activated state, and finally establish an association relationship between the payment token to be activated and the target electronic device identifier of the target electronic device, which enables the payment token to be activated to become a new target payment token, and then deleting an association relationship between the original target payment token to be activated and the target electronic device identifier of the target electronic device.

In some embodiments of the application, the Internet financial platform server may feedback second prompt information to the target electronic device. The second prompt information may be configured to prompt the user that the default payment card for the target electronic device has been successfully changed, and the target electronic device can use the NFC payment function normally through the new default payment card.

Therefore, in the embodiment of the application, A mapping relationship between the default payment card account number and the target electronic device can be changed by establishing an association relationship between the payment token to be activated and the target electronic device and deleting an association relationship between the original target payment token and the target electronic device.

In still some other embodiments of the application, before the S610, the data processing method may further include: receiving a payment card binding request sent by the target electronic device; parsing, in response to the payment card binding request, the payment card binding request to obtain information of the payment card binding request, wherein the information of the payment card binding request includes a payment card account number which needs to be bound; generating a token generation request according to the payment card account number which needs to be bound; sending the token generation request to a payment token management server, wherein the token generation request is configured to request the payment token management server to generate a payment token corresponding to the payment card account number which needs to be bound; receiving the payment token corresponding to the payment card account number which needs to be bound fed back by the payment token management server; and storing the payment card account number which needs to be bound and the payment token corresponding to the payment card account number which needs to be bound in association with each other.

The user can first login an account of a financial application of the target electronic device to make the financial application be in a login state, and select in an application interface of the financial application a target electronic device bound to the account, that is, an electronic device that the user is operating. Then, the user can add a payment card account number for being bound to the target electronic device in the application interface of the financial application as the payment card account number which needs to be bound, so that the target electronic device can generate a payment card binding request according to the payment card account number which needs to be bound. Next, the target electronic device may send the payment card binding request to the Internet financial platform server.

After receiving the payment card binding request, the Internet financial platform server can parse the payment card binding request to obtain the payment card account number which needs to be bound and the target electronic device identifier. According to the payment card account number which needs to be bound, a token generation request is generated, and the token generation request is sent to the payment token management server.

In some embodiments, the payment token management server may be the TSP platform server 130 shown in FIG. 2 to FIG. 4. After receiving the token generation request, the TSP platform server may parse the token generation request to obtain the payment card account number which needs to be bound, then generate a payment token corresponding to the payment card account number which needs to be bound, and store the payment card account number which needs to be bound with the payment token corresponding to the payment card account number which needs to be bound in association with each other. The payment token corresponding to the payment card account number which needs to be bound is fed back to the Internet financial platform server.

The Internet finance platform server can receive the payment token corresponding to the payment card account number which needs to be bound fed back by the TSP platform server, and then store the payment card account number which needs to be bound and the payment token corresponding to the payment card account number which needs to be bound in association with each other, so that the payment token corresponding to the default payment card account number can be sent to the target electronic device when the user is setting or changing a default payment card account number for the target electronic device.

Further, the Internet financial platform server may send third prompt information to the target electronic device after the target payment card account number is bound to the target electronic device. The third prompt information is configured to prompt the user that the payment card account number which needs to be bound has been successfully bound to the target electronic device.

In the embodiment of the application, the TSP platform server may generate the payment token corresponding to the payment card account number which needs to be bound by using a preset token generation method.

For example, the token generation method may use a preset encryption algorithm to encrypt all digits of the payment card account number which needs to be bound to obtain an encrypted character string, and use the encrypted character string as the payment token corresponding to the payment card account number which needs to be bound. For another example, the token generation method may use a preset encryption algorithm to encrypt a part of digits of the payment card account number which needs to be bound to obtain an encrypted character string, and to perform splicing of unencrypted digits of the payment card account number which needs to be bound with the encrypted character string to obtain the payment token corresponding to the payment card account number which needs to be bound.

In some embodiments of the application, the Internet financial platform server may communicate with the TSP platform server through the TSM platform server, so as to improve data security.

In yet another embodiment of the application, the data processing method may further include: receive a state changing request; parsing in response to the state changing request, the state changing request to obtain information of the state changing request, wherein the information of the state changing request includes a payment card account number whose state needs to be changed and a target payment state of the target electronic device; acquiring a payment token whose state is to be changed which is stored in association with the payment card account number whose state needs to be changed; and updating a token state corresponding to the payment token whose state is to be changed to be the target payment state.

In some embodiments of the application, the state changing request is configured to request the Internet finance platform server to update a token state corresponding to a payment token whose state is to be changed and is stored in association with a payment card account number specified by the user whose state is to be changed to a target payment state specified by the user for the target electronic device. The state changing request may be a state changing request sent by the target electronic device, or a state changing request sent by any other electronic device other than the target electronic device, as long as the electronic device is installed with the financial application corresponding to the Internet financial platform and an account number logged in the financial application is bound to the target electronic device for which payment state of an NFC payment function needs to be changed.

Specifically, the user may first login an account in the financial application of the electronic device enable the financial application to be in a login state, and select a target electronic device to which the account has been bound in an application interface of the financial application. Then, the user may input a payment card account number whose state is to be changed and a target payment state of the target electronic device in the application interface of the financial application, wherein the target payment state may be a payment state of the target electronic device that the user wants it to be changed. The electronic device operated by the user can generate a state changing request according to the payment card account number whose state is to be changed and the target payment state, and send the state changing request to the Internet financial platform server.

In the embodiment of the application, the target payment state may include any one of an activated state, a loss-reported state, and an unbound state. The target payment state may be a normal state or an abnormal state, wherein the abnormal state may include any one of the loss-reported state and the unbound state, and the normal state may include an activated state.

The activated state means that the NFC payment function of the electronic device has been activated and is available. The loss-reported state means that the NFC payment function of the electronic device has been activated but is in a loss-report registration state. In the loss-reported state, the NFC payment function is suspended. The unbound state means that the NFC payment function of the electronic device has been activated and has not been bound with a payment card account number. In the unbound state, the NFC payment function is also suspended.

In the embodiment of the application, the target electronic device or any other electronic device may directly communicate with the Internet financial platform server.

In some embodiments of the application, the information of the state changing request information may further include the target electronic device identifier of the target electronic device.

That is, after the electronic device operated by the user receives the payment card account number whose state is to be changed and the target payment state of the target electronic device inputted by the user, the electronic device may acquire the target electronic device identifier corresponding to the target electronic device, and then generate a state changing request based on the target electronic device identifier, the payment card account number whose state is to be changed and the target payment state.

In some embodiments of the application, the Internet financial platform server may store the token state corresponding to the payment token. For example, the Internet financial platform server may add a state bit to the payment token, wherein the state bit is provided with a state value, and one state value corresponds to one token state, and different state values correspond to different token states. Moreover, the token state may be same as the payment state.

In these embodiments, since the token state is the same as the payment state, the Internet finance platform server may determine a target state value corresponding to a token state that is the same as the target payment state, and set the state bit of the payment token whose state is to be changed to be the target state value, so as to update the token state corresponding to the payment token whose state is to be changed to be the target payment state.

In the embodiment of the application, since one electronic device stores one payment token which is in an activated state, and a token state corresponding to each payment token is the same as the payment state, the Internet financial platform server can, according to a token state corresponding to a payment token, determine the payment state of the electronic device corresponding to the payment token, and then determine whether to execute a transaction corresponding to a transaction request that carries the payment token according to the payment state of the electronic device.

Therefore, it is possible to update the target payment state of the target electronic device with the target token state corresponding to the target payment token without deleting the target payment token in the target electronic device. Thus, it is possible to avoid a problem that a user cannot change the payment state of the target electronic device after the target electronic device is lost merely by updating the target payment state of the target payment token which is stored in the Internet financial platform server, thereby reducing a risk of the bank account associated with the target electronic device being stolen and used, and improving security of the user's bank account.

In the embodiment of the application, regardless of whether the payment card attribute corresponding to the payment card account number whose state needs to be changed indicates a non-default payment card for the target electronic device or a default payment card for the target electronic device, the token state corresponding to the payment token whose state is to be changed can be directly updated to the target payment state, and then the fourth prompt information is fed back to the target electronic device. The fourth prompt information is configured to prompt the user that the payment state of the payment card account number which is bound to the target electronic device and whose state needs to be changed has been changed to be the target payment state.

In some embodiments of the application, the information processing method may further include: receiving a transaction request sent by a target acquiring device; parsing the transaction request in response to the transaction request to obtain information of the transaction request, wherein the information of the transaction request includes the target payment token; querying for a token state corresponding to the target payment token; refusing to execute a transaction corresponding to the transaction request in a case where the token state corresponding to the target payment token is an abnormal state, wherein the abnormal state includes any one of a loss-reported state and an unbound state.

Specifically, when a user is using a target electronic device to implement payment, a merchant can read an activated payment token (i.e. the target payment token) stored in a target security element of the target electronic device through a target acquiring device. The target acquiring device generates a transaction request according to the target payment token, a target acquiring device identifier of the target acquiring device and transaction amount, and then send the transaction request to the Internet financial platform server.

The target acquiring device identifier may be an IP address of the target acquiring device, or may be a device ID of the target acquiring device.

The Internet financial platform server can receive the transaction request sent by the target acquiring device, analyze the transaction request to obtain the target payment token, the target acquiring device identifier and the transaction amount, and then query for a token state corresponding to the target payment token. The Internet financial platform server can refuse to execute a transaction corresponding to the transaction request when the token state corresponding to the target payment token is abnormal; query for a target transaction card account number which is stored in association with the target payment token when the token state corresponding to the target payment token is normal, and send the target transaction card account number, the target acquiring device identifier and the transaction amount to a server of a card issuer, so that the server of the card issuer finishes the transaction corresponding to the transaction request, by which a transfer of the transaction amount from the target transaction card account number to a transaction card account number corresponding to the target acquiring device identifier can be realized, and then feeds a transaction completion result to the Internet financial platform server. After receiving the transaction completion result, the Internet financial platform server may forward the transaction completion result to the target acquiring device.

In the embodiment of the application, the target acquiring device may directly communicate with the Internet financial platform server, and the target acquiring device may communicate with the Internet financial platform server through the acquiring platform server, which is not limited herein.

Therefore, after the target electronic device is lost, the user does not need to delete the personalized data or payment token which are stored in the target security element of the target electronic device, but only needs to change the payment state of the target electronic device to an abnormal state, so that the token state corresponding to the payment token in the target electronic device is changed to an abnormal state, and then when the target electronic device is used for payment again, the Internet financial platform server can refuse to execute the transaction, so as to avoid a bank account associated with the target electronic device from being stolen and used, thereby improving security of the user's bank account.

In some other embodiments of the application, in order to further reduce the risk of the payment card account associated with the target electronic device being stolen and used, after information of the state changing request is received in a case where the target payment state includes any one of the loss-reported state and the unbound state, the information processing method may further include: deleting an association relationship between the payment card account number whose state needs to be changed and the target electronic device in a case where a payment card attribute corresponding to the payment card account number whose state needs to be changed is a target attribute, wherein the target attribute indicates a default payment card for the target electronic device.

Specifically, the Internet financial platform server can determine whether there is an association relationship between the payment token and the target electronic device, and then determine a payment card attribute corresponding to a payment card account number which is stored in association with the payment token. If there is an association relationship between the payment token and the target electronic device, then the payment card attribute corresponding to the payment card account number which is stored in association with the payment token indicates a default payment card for the target electronic device, otherwise the payment card attribute corresponding to the payment card account number which is stored in association with the payment token indicates a non-default payment card for the target electronic device.

Since the payment token is stored in the target security element of the target electronic device only when the payment card attribute corresponding to the payment card account number which is stored in association with the payment token indicates a default payment card for the target electronic device, it requires only that the token state corresponding to the payment token whose state is to be changed is updated to the target payment state in a case where the payment card attribute corresponding to the payment card account number whose state needs to be changed indicates is a non-default payment card for the target electronic device. In the case where the payment card attribute corresponding to the payment card account number whose state needs to be changed indicates is a default payment card for the target electronic device, since the target security element of the target electronic device stores the payment token whose state is to be changed, it may further delete the association relationship between the payment card account number whose state needs to be changed and the target electronic device in order to avoid occurrence of errors in verification by the Internet financial platform server, so that when a transaction request corresponding to the payment token whose state is to be changed is received and it is determined that the target payment state is normal, it is further determined whether there is an association relationship between the payment token whose state is to be changed and the target electronic device, so as to determine whether to execute a transaction corresponding to the transaction request.

Specifically, if there is an association relationship between the payment token to be changed and the target electronic device, the transaction corresponding to the transaction request will be executed; and if there is no association between the payment token to be changed and the target electronic device, the transaction corresponding to the transaction request will not be executed.

Therefore, in the embodiment of the application, security of a bank account associated with the target electronic device can be further improved.

In still other embodiments of the application, after the refusing to execute the transaction corresponding to the transaction request, the information processing method may further include: generating transaction feedback information corresponding to the transaction request according to the token state corresponding to the target payment token; and sending the transaction feedback information to the target acquiring device.

Specifically, the Internet financial platform server can generate transaction feedback information corresponding to the transaction request, wherein the transaction feedback information carries the token state corresponding to the target payment token, and then sends the transaction feedback information to the target acquiring device. Upon reception of the transaction feedback information, the target acquiring device can display the token state corresponding to the target payment token carried in the transaction feedback information, so as to show the target payment state of the target electronic device to a transaction-related person (payee or payer) to inform reasons for refusal of the transaction to the transaction-related person.

Below, each process of data processing according to the embodiments of the application will be described in detail by taking FIG. 7 to FIG. 10 as examples.

FIG. 7 shows a schematic flowchart of an example of a process for binding a payment card according to an embodiment of the application.

As shown in FIG. 7, the process for binding the payment card may include S701-S714.

At S701, a user opens an application interface of a financial application in a target electronic device, logs in an account in the application interface of the financial application, and selects a type of a payment card to be bound to the target electronic device, and the target electronic device receives a payment card type inputted by the user.

At S702, the user inputs a payment card account number which needs to be bound to the target electronic device on the application interface of the financial application, and the target electronic device receives the payment card account number inputted by the user.

At S703, the target electronic device makes a judgment on the payment card type, and then the process goes to S704 if the payment card type is a debit card type, and the process goes to S705 if the payment card type is a credit card type.

At S704, the target electronic device displays a debit card verification page, so that the user checks payment card information corresponding to the payment card account number and inputs a withdrawal password and a verification code sent by an Internet financial platform server of the financial application when confirming correctness of the withdrawal password, and the target electronic device receives the verification code inputted by the user, and then the process goes to S706.

At S705, the target electronic device displays a credit card verification page, so that the user checks payment card information corresponding to the payment card account number, and inputs a CVN2 code of the credit card, expiration date of the credit card and a verification code sent by the Internet financial platform server of the financial application when confirming correction of the CVN2 code of the debit card and the expiration date of the credit card, and the target electronic device receives the verification code inputted by the user, and then the process goes to S706.

At S706, the target electronic device generates a payment card binding request according to the verification code, the payment card account number and a target electronic device identifier of the target electronic device.

At S707, the target electronic device sends the payment card binding request to the Internet financial platform server.

At S708, the Internet financial platform server parses, in response to the payment card binding request, the payment card binding request to obtain the verification code, the payment card account number and the target electronic device identifier of the target electronic device, and generates a token generation request based on the payment card account number in a case of successful verification through the verification code.

At S709, the Internet financial platform server sends the token generation request to the TSP platform server.

At S710, the TSP platform server generates a payment token corresponding to the payment card account number in response to the token generation request, and stores the payment card account number and the payment token in association with each other.

At S711, the TSP platform server sends the payment token corresponding to the payment card account number to the Internet financial platform server.

At S712, the Internet financial platform server stores the payment card account number and the payment token in association with each other.

At S713, the Internet financial platform server sends third prompt information to the target electronic device.

At S714, the target electronic device displays third prompt information to prompt the user that the payment card account number has been successfully bound to target electronic device.

Figure 8:
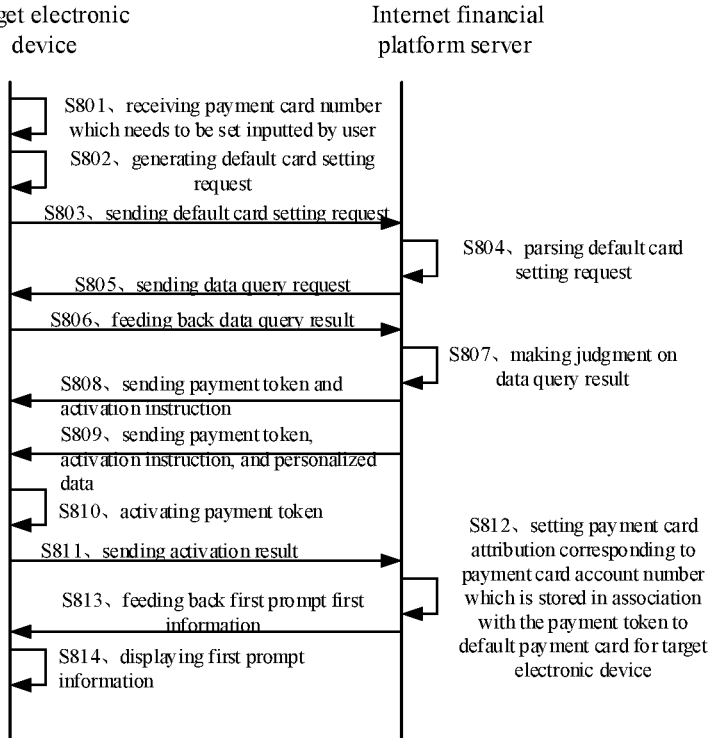
FIG. 8 is a schematic flowchart of an example of a process for setting a default payment card according to an embodiment of the application.

FIG. 8 shows a schematic flowchart of an example of a process for setting a default payment card according to an embodiment of the application.

As shown in FIG. 8, the process for setting a default payment card may include S801-S814.

At S801, a user opens an application interface of a financial application in a target electronic device, logs in an account in the application interface of the financial application, and selects, from at least one payment card account number bound with the target electronic device, a payment card account number which needs to be set as a default payment card for the target electronic device, and the target electronic device receives the payment card account number which needs to be set inputted by the user.

At S802, the target electronic device generates a default card setting request according to the payment card account number and a target electronic device identifier of the target electronic device.

At S803, the target electronic device sends the default card setting request to the Internet financial platform server.

At S804, the Internet financial platform server parses, in response to the default card setting request, the default card setting request to obtain the payment card account number and the target electronic device identifier.

At S805, the Internet financial platform server queries for a payment token which is stored in association with the payment card account number, and then sends a data query request to the target electronic device.

At S806, after receiving the data query request, the target electronic device may query in a target security element to determine whether there is personalized data corresponding to the payment token, and feeds a data query result back to the Internet financial platform server.

At S807, the Internet financial platform server may make a judgment on the data query result, and then the process goes to S808 if the data query result indicates that the personalized data corresponding to the payment token has been found in the target security element, and then the process goes to S809 if the data query result indicates that the personalized data corresponding to the payment token has not been found in the target security element.

At S808, the Internet financial platform server sends the payment token and an activation instruction corresponding to the payment token to the target electronic device, and then the process goes to S810.

At S809, the Internet financial platform server sends the payment token, the activation instruction corresponding to the payment token and the personalized data corresponding to the payment token to the target electronic device, and then the process goes to S810.

At S810, the target electronic device loads the payment token into the personalized data corresponding to the payment token and activates the payment token such that it is in an activated state.

At S811, the target electronic device sends an activation result which indicates that the target electronic device has set the payment token to be an activated state to the Internet financial platform server.

At S812, the Internet financial platform server sets a token state corresponding to the payment token to be an activated state, then sets a payment card attribute corresponding to a payment card account number which is stored in association with the payment token to be a default payment card for the target electronic device, and establishes an association relationship between the payment token and the target electronic device.

At S813, the Internet financial platform server feeds first prompt information back to the target electronic device.

At S814, the target electronic device displays the first display information to prompt the user that a default payment card has been successfully set for the target electronic device.

Figure 9:
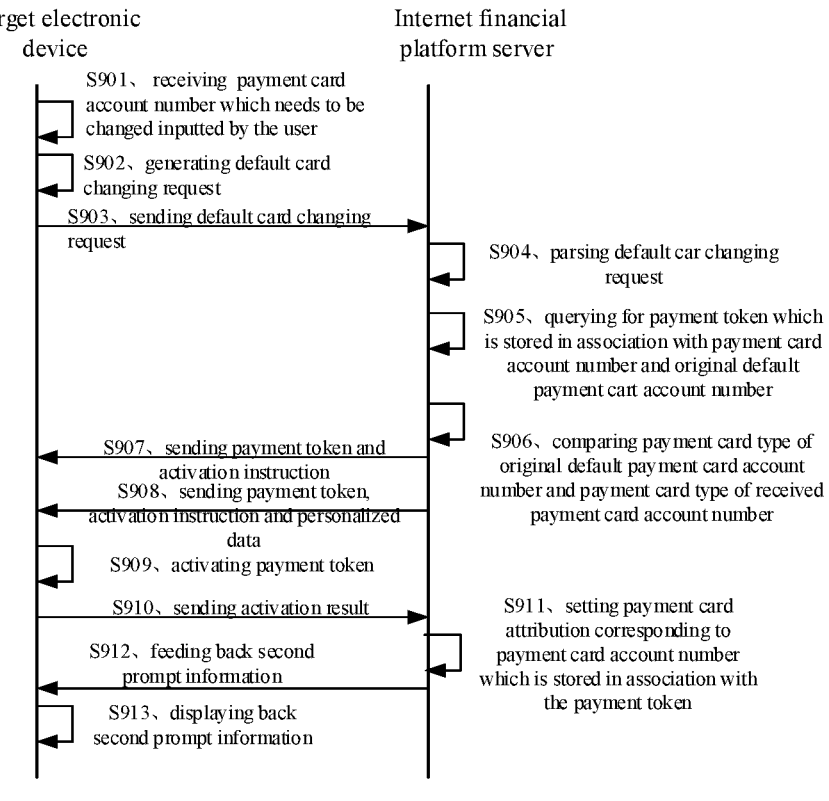
FIG. 9 is a schematic flowchart of an example of a process for changing a default payment card according to an embodiment of the application.

FIG. 9 shows a schematic flowchart of an example of a process for changing a default payment card according to an embodiment of the application.

As shown in FIG. 9, the process for changing a default payment card may include S901-S913.

At S901, a user opens an application interface of a financial application in a target electronic device, logs in an account in the application interface of the financial application, and selects, from at least one payment card account number bound with the target electronic device, a payment card account number which needs to be changed as a new default payment card for the target electronic device, and the target electronic device receives the payment card account number which needs to be changed inputted by the user.

At S902, the target electronic device generates a default card changing request according to the payment card account number and a target electronic device identifier of the target electronic device.

At S903, the target electronic device sends the default card changing request to the Internet financial platform server.

At S904, the Internet financial platform server parses, in response to the default card changing request, the default card changing request to obtain the payment card account number and the target electronic device identifier.

At S905, the Internet financial platform server queries a payment token which is stored in association with the payment card account number and a payment token that is currently associated with the target electronic device identifier, and queries a payment card account number which is stored in association with the queried payment token, wherein the queried payment card account number is an original default payment card account number, that is, a payment card account number whose payment card attribute indicates a default payment card for the target electronic device.

At S906, the Internet financial platform server compares a payment card type of the original default payment card account number with a payment card type of the received payment card account number, and then the process goes to S907 if they are the same as each other, and the process goes to S908 if they are different from each other.

At S907, the Internet financial platform server sends the payment token corresponding to the received payment card account number and an activation instruction corresponding to the payment token to the target electronic device, and then the process goes to S909.

At S908, the Internet financial platform server sends the payment token corresponding to the received payment card account number, the activation instruction corresponding to the payment token and personalized data corresponding to the payment token to the target electronic device, and then the process goes to S909.

At S909, the target electronic device loads the payment token into the personalized data corresponding to the payment token and activates the payment token such that it is in an activated state.

At S910, the target electronic device sends an activation result which indicates that the target electronic device has set the payment token to be in an activated state to the Internet financial platform server.

At S911, the Internet financial platform server first sets a payment card attribute corresponding to a payment card account number which is stored in association with the payment token to be a default payment card for the target electronic device, sets a payment card attribute corresponding to the original default payment card account number to be a non-target attribute, then sets a token state corresponding to the payment token to an activated state and a token state corresponding to the payment token which is stored in association with the original default payment card account number to be an inactivated state, and finally, establishes an association relationship between the payment token and the target electronic device and deletes an association between the payment token which is stored in association with the original default payment card account number and the target electronic device.

At S912, the Internet financial platform server feeds second prompt information back to the target electronic device.

At S913, the target electronic device displays the second prompt information to prompt the user that the default payment card for the target electronic device has been successfully changed.

Figure 10:
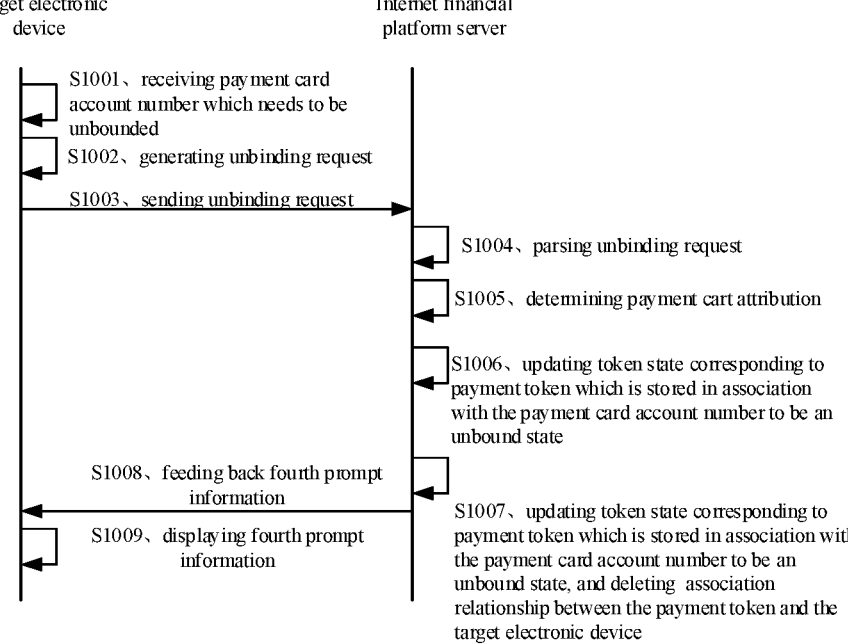
FIG. 10 is a schematic flowchart of an example of a process for unbinding a payment card according to an embodiment of the application.

FIG. 10 shows a schematic flowchart of an example of a process for unbinding a payment card according to an embodiment of the application.

As shown in FIG. 10, the process for unbinding a payment card may include S1001-S1012.

At S1001, a user opens an application interface of a financial application in a target electronic device, logs in an account in the application interface of the financial application, and selects a payment card account number which needs to be unbound from at least one payment card account number bound to the target electronic device, and the target electronic device receives the payment card account number which needs to be unbound and a target payment state of the target electronic device inputted by the user, wherein the target payment state is an unbound state.

At S1002, the target electronic device generates an unbinding request according to the target electronic device identifier, the payment card account number and the target payment state.

At S1003, the target electronic device sends the unbinding request to the Internet financial platform server.

At S1004, the Internet financial platform server parses, in response to the unbinding request, the unbinding request to obtain the target electronic device identifier, the payment card account number and the target payment state.

At S1005, the Internet financial platform server queries for a payment card attribute corresponding to the payment card account number, and makes a judgment on the payment card attribute corresponding to the payment card account number, and the process goes to S1006 if the payment card attribute is a non-default payment card for the target electronic device, and the process goes to S1007 if the payment card attribute is a default payment card for the target electronic device.

At S1006, the Internet financial platform updates a token state corresponding to a payment token which is stored in association with the payment card account number to be an unbound state, and then the process goes to S1008.

At S1007, the Internet financial platform updates a token state corresponding to a payment token which is stored in association with the payment card account number to be an unbound state, and deletes an association relationship between the payment token which is stored in association with the payment card account number and the target electronic device, and then the process goes to S1008.

At S1008, the Internet financial platform server sends fourth prompt information to the target electronic device.

At S1009, the target electronic device displays the fourth prompt information to prompt the user that the payment state of the payment card account number which needs to be unbound has been changed to an unbound state.

In a case where the payment card attribute corresponding to the payment card account number which needs to be unbound indicates a default payment card for the target electronic device, after the payment card account number has been successfully unbound from the target electronic device, the Internet financial platform server, when receiving a transaction request sent by an acquiring device which corresponds to the payment token stored in association with the payment card account number, may refuse to execute a transaction corresponding to the transaction request if it is found that the token state of the payment token is in an unbound state.

It should be noted that, after the user clicks an unbinding function, the token state corresponding to the payment token which is stored in the Internet financial platform server can be updated to an unbound state. The user may further click a loss-reporting function to enable the token state corresponding to the payment token which is stored in the Internet financial platform server to be updated to a loss-reported state. Specifically, a process for reporting loss of a payment card is similar to a process for unbinding the payment card, and will be not repeated here.

In addition, after the token state corresponding to the payment token which is stored in the Internet financial platform server has been updated to the unbound state or the loss-reported state, the user may further click a rebinding function or a loss-report canceling function to enable the payment token corresponding to the payment token which is stored in the Internet financial platform server to be updated to an activated state again, a process for which is similar to the process for unbinding the payment card, and will not be repeated here.

Therefore, in the embodiment of the application, there is a loosely coupled relationship between the target electronic device and a bound payment card account number and between the target electronic device and personalized data loaded in the target security element, which is dynamic mapping relationship. Therefore, during a sequent process for re-binding a default payment car, it will not cause frequent verification, download and rewriting processes for the card. Moreover, the target security element may store general personalized data for loading of the payment token, so that differences between personalized data of various card issuers can be eliminates, thereby improving compatibility of personalized data with various acquiring devices, so as to facilitate better industrial cooperation and promotion prospects.

Figure 11:
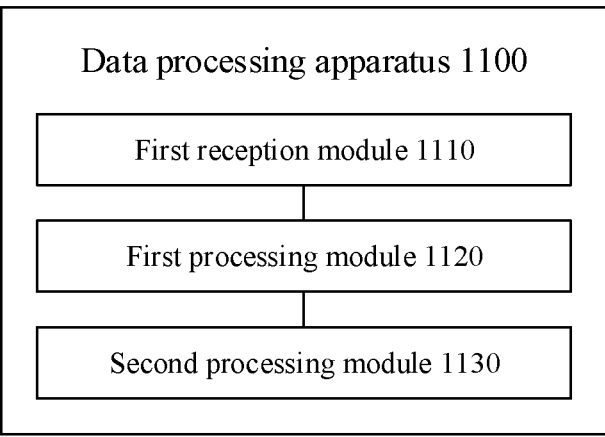
FIG. 11 is a schematic structural diagram of an example of a data processing apparatus according to the application.

FIG. 11 shows a schematic structural diagram of an example of a data processing apparatus according to the application.

In some embodiments of the application, the apparatus shown in FIG. 11 may be a target electronic device among the electronic devices 110 shown in FIG. 1 to FIG. 4. The target electronic device may be any one of the electronic devices 110.

As shown in FIG. 11, the data processing apparatus 1100 may include a first reception module 1110, a first processing module 1120 and a second processing module 1130.

The first reception module 1110 may be configured to receive target activation data and a target activation instruction sent by a target server, wherein the target activation data includes a payment token to be activated corresponding to a payment card account number which needs to be activated.

The first processing module 1120 may be configured to update, in response to the target activation instruction, a target payment token in target personalized data to be the payment token to be activated, wherein a transaction card type indicated by the target personalized data is same as a transaction card type indicated by the target activation instruction.

The second processing module 1130 may be configured to set the updated target payment token to be in an activated state.

In the embodiment of the application, upon reception of a target activation instruction and a payment token to be activated corresponding to a payment card account number which needs to be activated sent by a target server, a target payment token in a target personalized data which belongs to a transaction cart having a same type as that indicated in the target activation instruction can be directly updated as the payment token to be activated and the updated target payment token can be set to be in an activated state, so it is possible to directly update the target payment token in the target personalized data by using the payment token to be activated and to activate the updated target payment token without deleting an activated payment token and its corresponding personalized data in the process of activating the payment token to be activated, thereby reducing processes of deleting personalized data, verifying personalized data and downloading personalized data in the process of activating the payment token to be activated, and thus avoiding errors caused by the above-mentioned processes when setting a default payment card so as to improve a success rate of setting the default payment card.

In some embodiments of the application, the target personalized data may be personalized data which is stored in the target security element and for which the payment token is in an activated state.

In some other embodiments of the application, the target personalized data may be personalized data which is stored in the target security element and for which a payment token is in an inactivated state.

In some embodiments of the application, the target activation data may further includes the target personalized data, wherein the data processing apparatus 1100 may further include a first storage module configured to store the target personalized data in the target security element.

In some embodiments of the application, the data processing apparatus 1100 may further include a third processing module configured to set an activated payment token other than the updated target payment token to be in an inactivated state.

In some embodiments of the application, the payment card account number may include a default payment card account number which needs to be set, wherein the data processing apparatus 1100 may further include a second reception module, a second generation module and a second transmission module.

The second reception module may be configured to receive the default payment card account number which needs to be set.

The second generation module may be configured to generate a default card setting request according to the default payment card account number which needs to be set.

The second transmission module may be configured to send the default card setting request to the target server, wherein the default card setting request is configured to request the target server to feed back the target activation data and the target activation instruction corresponding to the default payment card account number which is to be set.

In some other embodiments of the application, the payment card account number may include a default payment card account number which needs to be changed, wherein the data processing apparatus 1100 may further include a third reception module, a third generation module and a third transmission module.

The third reception module may be configured to receive the default payment card account number which needs to be changed.

The third generation module may be configured to generate a default card changing request according to the default payment card account number which needs to be changed.

The third transmission module may be configured to send the default card changing request to the target server, wherein the default card changing request is configured to request the target server to feed back the target activation data and the target activation instruction corresponding to the default payment card account number which needs to be changed.

It should be noted that the data processing apparatus 1100 shown in FIG. 11 is able to execute various steps in the method embodiment shown in FIG. 5, and realize various processes and effects in the method embodiment shown in FIG. 5, which will not be repeated here.

Figure 12:
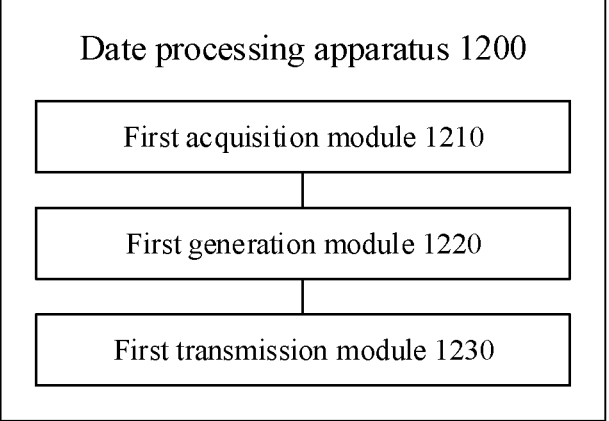
FIG. 12 is a schematic structural diagram of another example of a data processing apparatus according to the application.

FIG. 12 shows a schematic structural diagram of another example of a data processing apparatus according to the application.

In some embodiments of the application, the apparatus shown in FIG. 12 may be the Internet financial platform server 120 shown in FIG. 1 to FIG. 4.

As shown in FIG. 12, the data processing apparatus 1200 may include a first acquisition module 1210, a first generation module 1220 and a first transmission module 1230.

The first acquisition module 1210 may be configured to acquire a target activation instruction and a payment token to be activated which is stored in association with a payment card account number which needs to be activated, wherein a transaction card type of the payment card account number which needs to be activated is same as a transaction card type indicated by the target activation instruction.

The first generation module 1220 may be configured to generate target activation data according to the payment token to be activated.

The first transmission module 1230 can be configured to send the target activation data and the target activation instruction to a target electronic device, wherein the target activation instruction is configured to request the target electronic device to update a target payment token in target personalized data to be the payment token to be activated and set the updated target payment token to in an activated state, wherein a transaction card type indicated by the target personalized data is same as the transaction card type indicated by the target activation instruction.

In the embodiment of the application, after a payment token to be activated which is stored in association with a payment card account number which needs to be activated and a target activation instruction which indicates a same transaction card type as that of the payment card account number which needs to be activated, target activation data is generated according to the payment token to be activated, and the target activation data and the target activation instruction are sent to the target electronic device, so that the target electronic device updates a target activation token in target personalized data of the same transaction card type as that indicated by the target activation instruction to be the payment token to be activated, and sets the updated target payment token to be in an activated state, and thus the target activation token in the target personalized data can be updated directly with the payment token to be activated and the updated target payment token can be activated accordingly without deleting an activated payment token and its corresponding personalized data in a process of activating the payment token to be activated, thereby reducing processes of deleting personalized data, verifying personalized data and downloading personalized data in the process of activating the payment token to be activated, and thus avoiding errors caused by the above-mentioned processes when setting a default payment card so as to improve a success rate of setting the default payment card.

In some embodiments of the application, the data processing apparatus 1200 may further include a second acquisition module configured to the target personalized data, wherein the first generation module 1220 may be particularly configured to generate the target activation data according to the payment token to be activated and the target personalized data.

In some embodiments of the application, the data processing apparatus 1200 may further include a fourth transmission module and a fourth reception module.

The fourth transmission module may be configured to send a data query request to the target electronic device, wherein the data query request is configured to find the target personalized data in a target security element of the target electronic device.

The fourth reception module may be configured to receive a data query result fed back by the target electronic device, wherein the second acquisition module may be specifically configured to acquire the target personalized data in a case where the data query result indicates that the target personalized data has not been found in the target security element.

In some embodiments of the application, the payment card account number may include a default payment card account number which needs to be set, wherein the data processing apparatus 1200 may further include a fifth reception module and a first parsing module.

The fifth reception module may be configured to receive a default card setting request sent by the target electronic device.

The first parsing module may be configured to parse, in response to the default card setting request, the default card setting request to obtain information of the default card setting request, wherein the information of the default card setting request includes the default payment card account number which needs to be set.

In some embodiments of the application, the data processing apparatus 1200 may further include a sixth reception module, a fourth processing module, a fifth processing module and a sixth processing module.

The sixth reception module may be configured to receive an activation result sent by the target electronic device, wherein the activation result is configured to indicate that the target electronic device has set the payment token to be activated to be in an activated state.

The fourth processing module may be configured to set, in response to the activation result, a payment card attribute corresponding to the payment card account number which needs to be activated as a target attribute, wherein the target attribute indicates a default payment card for the target electronic device.

The fifth processing module may be configured to set a token state corresponding to the payment token to be activated to be an activated state.

The sixth processing module may be configured to establish an association relationship between the payment token to be activated and the target electronic device.

In some embodiments of the application, the payment card account number may include a default payment card account number which needs to be changed, wherein the data processing apparatus 1200 may further include a seventh reception module and a second parsing module.

The seventh reception module may be configured to receive a default card changing request sent by the target electronic device.

The second parsing module may be configured to parse, in response to the default card changing request, the default card changing request to obtain information of the default card changing request, wherein the information of the default card changing request includes the default payment card account number which needs to be changed.

In some embodiments of the application, the data processing apparatus 1200 may further include a third acquisition module configured to acquire a target payment card account number, wherein a payment card attribute corresponding to the target payment card account number is a target attribute, and the target attribute indicates a default payment card for the target electronic device. The fourth transmission module may be particularly configured to send the data query request to the target electronic device in a case where a payment card type of the target payment card account number is different from a payment card type of the default payment card account number which needs to be changed.

In some embodiments of the application, the data processing apparatus 1200 may further include an eighth reception module, a seventh processing module, an eighth processing module and a ninth processing module.

The eighth reception module may be configured to receive an activation result sent by the target electronic device, wherein the activation result is configured to indicate that the target electronic device has set the payment token to be activated to be in an activated state.

The seventh processing module may be configured to set a payment card attribute corresponding to the payment card account number which needs to be activated as a target attribute and setting a payment card attribute corresponding to the target payment card account number as a non-target attribute in response to the activation result.

The eighth processing module may be configured to set a token state corresponding to the payment token to be activated to an activated state, and setting a token state corresponding to the target payment token which is stored in association with the target payment card account number to an inactivated state.

The ninth processing module may be configured to establish an association relationship between the payment token to be activated and the target electronic device, and deleting an association relationship between the target payment token and the target electronic device.

In some embodiments of the application, the data processing apparatus 1200 may further include a ninth reception module, a third parsing module, a fourth generation module, a fifth transmission module, a tenth reception module, and a second storage module.

The ninth reception module may be configured to receive a payment card binding request sent by the target electronic device.

The third parsing module may be configured to parse, in response to the payment card binding request, the payment card binding request to obtain information of the payment card binding request, wherein the information of the payment card binding request includes a payment card account number which needs to be bound.

The fourth generation module may be configured to generate a token generation request according to the payment card account number which needs to be bound.

The fifth transmission module may be configured to send the token generation request to a payment token management server, wherein the token generation request is configured to request the payment token management server to generate a payment token corresponding to the payment card account number which needs to be bound.

The tenth reception module may be configured to receive the payment token corresponding to the payment card account number which needs to be bound fed back by the payment token management server.

The second storage module may be configured to store the payment card account number which needs to be bound and the payment token corresponding to the payment card account number which needs to be bound in association with each other.

In some embodiments of the application, the data processing apparatus 1200 may further include an eleventh reception module, a fourth parsing module, a fourth acquisition module, and a tenth processing module.

The eleventh reception module may be configured to receive a state changing request.

The fourth parsing module may be configured to parse, in response to the state changing request, the state changing request to obtain information of the state changing request, wherein the information of the state changing request includes a payment card account number whose state needs to be changed and a target payment state of the target electronic device.

The fourth acquisition module may be configured to acquire a payment token whose state is to be changed which is stored in association with the payment card account number whose state is to be changed.

The tenth processing module may be configured to update a token state corresponding to the payment token whose state is to be changed to be the target payment state.

In some embodiments of the application, the target payment state may include any one of a loss-reported state and an unbound state, wherein the data processing apparatus 1200 may further include an eleventh processing module configured to delete an association relationship between the payment card account number whose state needs to be changed and the target electronic device in a case where a payment card attribute corresponding to the payment card account number whose state needs to be changed is a target attribute, wherein the target attribute indicates a default payment card for the target electronic device.

In some embodiments of the application, the target payment state may include any one of a loss-reported state, an unbound state, and an activated state.

In some embodiments of the application, the data processing apparatus 1200 may further include a twelfth reception module, a fifth parsing module, a twelfth processing module, and a thirteenth processing module.

The twelfth reception module may be configured to receive a transaction request sent by the target acquiring device.

The fifth parsing module may be configured to parse, in response to the transaction request, the transaction request to obtain information of the transaction request, wherein the information of the transaction request includes the target payment token.

The twelfth processing module may be configured to query for a token state corresponding to the target payment token.

The thirteenth processing module may be configured to refuse to execute a transaction corresponding to the transaction request in a case where the token state corresponding to the target payment token is an abnormal state, wherein the abnormal state includes any one of a loss-reported state and an unbound state.

In some embodiments of the application, the data processing apparatus 1200 may further include a fifth generation module and a sixth transmission module.

The fifth generation module may be configured to generate transaction feedback information corresponding to the transaction request according to the token state corresponding to the target payment token.

The sixth transmission module may be configured to send the transaction feedback information to the target acquiring device.

It should be noted that the data processing apparatus 1200 shown in FIG. 12 is able to execute various steps in the method embodiment shown in FIG. 6 and realize various processes and effects in the method embodiment shown in FIG. 6, which will not be repeated here.

Figure 13:
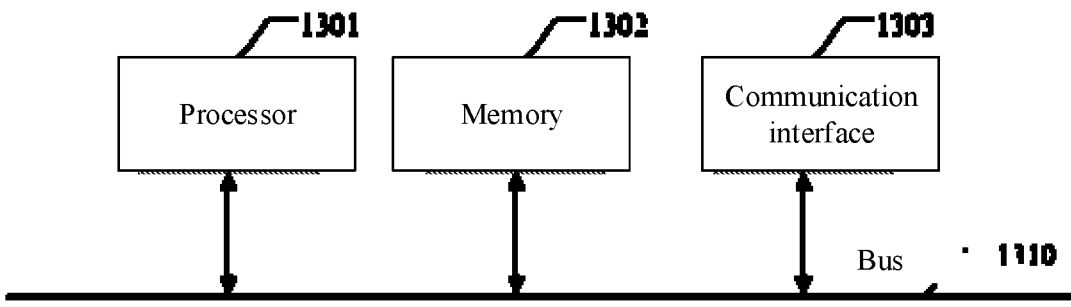
FIG. 13 is a schematic diagram of a hardware structure of an example of a data processing device according to the application.

FIG. 13 shows a schematic diagram of the hardware structure of an example of a data processing device according to the application.

The data processing device may include a processor 1301 and a memory 1302 having computer program instructions stored thereon.

Specifically, the above-mentioned processor 1301 may include a central processing unit (CPU), or a specific integrated circuit (Application Specific Integrated Circuit, ASIC), or may be configured as one or more integrated circuits for implementing the embodiments of the application.

The memory 1302 may include a mass storage for storing data or instructions. By way of example and not limitation, the memory 1302 may include a hard disk drive (Hard Disk Drive, HDD), a floppy disk drive, a flash memory, an optical disk, a magneto-optical disk, a magnetic tape, or a universal Serial bus (Universal Serial Bus, USB) drive or a combination of two or more of the above. The memory 1302 may include a removable or a non-removable (or fixed) media, where appropriate. The memory 1302 may be internal or external to the data processing device, where appropriate. In particular embodiments, the memory 1302 may be a non-volatile solid state memory. In particular embodiments, the memory 1302 may include a read only memory (ROM). Where appropriate, The ROM may be a mask programmed ROM, a programmable ROM (PROM), an erasable PROM (EPROM), an electrically erasable PROM (EEPROM), an electrically rewritable ROM (EAROM) or a flash memory or a combination of two or more of the above.

The processor 1301 reads and executes the computer program instructions stored in the memory 1302 to implement any one of the data processing methods in the foregoing embodiments.

In one example, the data processing device may further include a communication interface 1303 and a bus 1310. As shown in FIG. 13, the processor 1301, the memory 1302, and the communication interface 1303 are connected through the bus 1310 to communicate with each other.

The communication interface 1303 is mainly configured to facilitate implementation of communications between various modules, apparatuses, units and/or devices in the embodiments of the application.

The bus 1310 includes hardware, software, or both of them, and is configured to couple various components of the data processing device to each other. By way of examples and not limitations, the bus 1310 may include an accelerated graphics port (Accelerated Graphics Port, AGP) or other graphics bus, an enhanced industry standard architecture (Enhanced Industry Standard Architecture, EISA) bus, a front side bus (Front Side Bus, FSB), a hyper transport (Hyper Transport, HT) interconnect, an industry standard architecture (Industry Standard Architecture, ISA) bus, an infiniband interconnect, a low pin Count (Low Pin Count, LPC) bus, a memory bus, a microchannel architecture (Microchannel Architecture, MCA) bus, a peripheral component interconnect (Peripheral Component Interconnect, PCI) bus, a PCI-express (PCI-Express, PCI-X) bus, a serial advanced technology attachment (Serial Advanced Technology Attachment, SATA) bus, a video electronics standards association local (Video Electronics Standards Association Local, VLB) bus or any other suitable bus or a combination of two or more of the above. The bus 1310 may include one or more buses, where appropriate. Although the embodiments of the application describe and illustrate particular buses, the application anticipates any suitable bus or interconnects.

The data processing device is able to execute an information processing method according to the embodiments of the application, thereby implementing the data processing method and apparatus described in conjunction with FIG. 5 to FIG. 12.

In addition, referring to the data processing methods according to the foregoing embodiments, there may be provided a computer-readable storage medium in the embodiments of the application. The computer-readable storage medium has computer program instructions stored thereon; and the computer program instructions are executed by a processor to implement any one of the data processing methods in the foregoing embodiments.

To be clear, the application is not limited to the specific configurations and processes described above and illustrated in the figures. For sake of brevity, detailed descriptions of known methods are omitted here. In the above-described embodiments, several specific steps are described and shown as examples. However, the method processes of the application are not limited to the described and shown specific steps, and those skilled in the art can make various changes, modifications and additions or change the order between the steps after comprehending spirits of the application.

The functional blocks shown in the above-described structural block diagrams may be implemented in hardware, software, firmware, or a combination thereof. When implemented in hardware, the functional block may be, for example, an electronic circuit, an application specific integrated circuit (ASIC), suitable firmware, a plug-in, a function card, or the like. When implemented in software, such elements of the application may be programs or code segments for performing the required tasks. The program or code segments may be stored in a machine-readable medium or transmitted over a transmission medium or a communication link by data signals carried in carrier waves. A "machine-readable medium" may include any medium that can store or transmit information. Examples of the machine-readable media may include an electronic circuit, a semiconductor memory device, an ROM, a flash memory, an erasable ROM (EROM), a floppy disk, a CD-ROM, an optical disk, a hard disk, a fiber optic media, a radio frequency (RF) link, and the like. The code segments may be downloaded via a computer network such as the Internet, an intranet, or the like.

Various aspects of the application have been described above with reference to flowcharts and/or block diagrams of the methods, apparatus (systems) and machine program products according to the embodiments of the application. It should be understood that each block in the flowcharts and/or the block diagrams and a combination of the blocks in the flowcharts and/or the block diagrams may be implemented by programs or instructions. These programs or instructions may be provided to a processor of a general-purpose computer, a special-purpose computer, or other programmable data processing apparatus to produce a machine that causes these programs or instructions to be executed via the processor of the computer or other programmable data processing apparatus to implement functions/actions specified in one or more of the blocks in the flowcharts and/or the block diagrams. The processor may be, but is not limited to, a general-purpose processor, a special-purpose processor, an application specific processor, or a field programmable logic circuit. It should be understood that each block in the flowcharts and/or the block diagrams and a combination of the blocks in the flowcharts and/or the block diagrams may be implemented by a special-purpose hardware that performs the specified functions or actions, or may be implemented by a combination of special-purpose hardware and/or computer instructions.

It should also be noted that the exemplary embodiments mentioned in the application describe some methods or systems based on a series of steps or devices. However, the application is not limited to the order of the steps, that is, the steps may be performed in the order mentioned in the embodiments, or in an order different from the order mentioned in the embodiments, or several steps may be performed simultaneously.

The above-described embodiments are only specific implementations of the application. Those skilled in the art will clearly understand that specific operation processes of the above-described systems, modules and units may refer to corresponding processes in the foregoing method embodiments, in order for convenience and brevity of the description, and they will not be repeated here. It should be understood that a protection scope of the application is not limited to the embodiments, and those skilled in the art will easily anticipate various equivalent modifications or replacements within the technical scope disclosed in the application, and all of these modifications or replacements fall within the protection scope of the application.

What is claimed is:

1. A method of an electronic device for setting a near field communication (NFC) function of the electronic device equipped to perform a card payment operation, comprising:

receiving a first payment card account number inputted by
        a user of the electronic device;

establishing communication with a server;

sending a card activation request to the server for card activation;

receiving activation data and an activation instruction from the server responsive to the card activation request from the electronic device, wherein the activation data includes a first payment token corresponding to the first payment card account number and the activation instruction indicates a first transaction card type which is a same type as a transaction card type of the first payment card account number;

determining that target personalized data associated with the card payment operation is stored in a security element of the electronic device, wherein the target personalized data includes a personalized application identifier (AID) comprising a generic character string, a payment token, and a state value, and the generic character string includes at least an account type, an application type, an institution code of an application provider, and a chip card type;

after determining that the target personalized data is stored in the security element, directly updating, in response to the activation instruction, a target payment token in the target personalized data stored on the electronic device with the first payment token, without downloading the target personalized data so as to reduce data processes on the electronic device, wherein a second payment card account number corresponding to the target payment token was active for the NFC function, the target personalized data comprised a second transaction card type of the second payment card account number, and the second transaction card type is a same type as the first transaction card type indicated by the activation instruction;

setting the updated target payment token, which is the first payment token, to be in an activated state such that the first payment card account number is activated for the NFC function; and using the first payment card account number activated for the NFC function to implement a transaction between the electronic device and an acquiring device having an NFC information reading function.

2. The method of claim 1, wherein the determining that target personalized data associated with the card payment operation is stored in a security element of the electronic device further comprises:

if the target personalized data is not stored in the security element of the electronic device, receiving the target personalized data in the target activation data from the server; and storing the target personalized data in the security element.

3. The method of claim 2, wherein before the receiving the card activation request, the method further comprises:

receiving the first payment card account number via a selection by the user of the electronic device from a plurality of possible payment card account numbers;

generating the card activation request according to the selected first payment card account number; and wherein the card activating request is a default card setting request which is configured to request the server to set the selected first payment card account number as a default payment card account number for the NFC function.

4. The method according to claim 2, wherein before receiving the card activation request, the method further comprises:

receiving the first payment card account number via a selection by the user of the electronic device from a plurality of possible payment card account numbers;

generating the card activation request according to the selected first payment card account number, wherein card activation request is a default card changing request which is configured to request the server to change a default payment card account number for the NFC function to be the selected first payment card account number.

5. A device for setting a near-field communication (NFC) function of an electronic device, comprising: a processor and a memory storing computer program instructions;

wherein the processor is configured to execute the computer program instructions to implement the data processing method according to claim 1.

6. A non-transitory computer-readable storage medium storing computer program instructions, wherein the computer program instructions are executed by a processor to implement the data processing method according to claim 1.

* * * * *